US012298144B2

(12) United States Patent
Park et al.

(10) Patent No.: US 12,298,144 B2
(45) Date of Patent: May 13, 2025

(54) SERVER AND METHOD OF CONTROLLING THE SAME

(71) Applicants: Hyundai Motor Company, Seoul (KR); Kia Motors Corporation, Seoul (KR)

(72) Inventors: Minjae Park, Gyeonggi-do (KR); Jong Bok Lee, Gyeonggi-do (KR); Seunghyun Woo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 151 days.

(21) Appl. No.: 17/060,562

(22) Filed: Oct. 1, 2020

(65) Prior Publication Data
US 2021/0310820 A1 Oct. 7, 2021

(30) Foreign Application Priority Data
Apr. 1, 2020 (KR) .......................... 10-2020-0039825

(51) Int. Cl.
*G01C 21/34* (2006.01)
(52) U.S. Cl.
CPC ..... G01C 21/3492 (2013.01); G01C 21/3415 (2013.01); G01C 21/3423 (2013.01); G01C 21/3484 (2013.01)
(58) Field of Classification Search
CPC ............ G01C 21/3423; G01C 21/3492; G01C 21/3415; G01C 21/3484
See application file for complete search history.

(56) References Cited

U.S. PATENT DOCUMENTS

| | | | | |
|---|---|---|---|---|
| 6,208,934 B1* | 3/2001 | Bechtolsheim | .... | G01C 21/3685 701/428 |
| 8,738,292 B1* | 5/2014 | Faaborg | .................. | G08G 1/00 701/117 |
| 2005/0021227 A1* | 1/2005 | Matsumoto | ........ | G01C 21/3415 701/431 |
| 2008/0059061 A1* | 3/2008 | Lee | .................... | G01C 21/3461 340/995.19 |
| 2009/0119001 A1* | 5/2009 | Moussaeiff | ...... | G08G 1/096838 707/E17.014 |
| 2012/0010809 A1* | 1/2012 | Stut | .................... | G01C 21/3423 701/465 |

(Continued)

FOREIGN PATENT DOCUMENTS

KR 10-1254708 B1 4/2013

*Primary Examiner* — Aryan E Weisenfeld
(74) *Attorney, Agent, or Firm* — Fox Rothschild LLP

(57) ABSTRACT

A server is provided to recommend suitable personal mobility based on a recommended route. The server includes a communicator and a controller that determines a first route to an intermediate destination reachable by a vehicle or a public transport based on departure information and destination information received from an external device, and a second route from the intermediate destination reachable by foot or a personal mobility to a final destination. The controller determines a recommended personal mobility based on environment information of the second route and operates the communicator to transmit information about each of the first route, the second route, and the recommended personal mobility to the external device.

14 Claims, 11 Drawing Sheets

(56) References Cited

U.S. PATENT DOCUMENTS

| | | | |
|---|---|---|---|
| 2015/0066683 A1* | 3/2015 | Azose | G01C 21/3423 |
| | | | 705/26.7 |
| 2016/0291820 A1* | 10/2016 | Mak | G01C 21/34 |
| 2016/0298974 A1* | 10/2016 | Newlin | G08G 1/0141 |
| 2017/0191845 A1* | 7/2017 | Marueli | G01C 21/20 |
| 2018/0120123 A1* | 5/2018 | Seok | G01C 21/3661 |
| 2018/0135990 A1* | 5/2018 | Zhang | G01C 21/3407 |
| 2019/0360824 A1* | 11/2019 | Sai | G01C 21/30 |

* cited by examiner

FIG.4

| ROAD TYPE | RECOMMENDED PERSONAL MOBILITY (MAXIMUM SPEED/SIZE) |
|---|---|
| SIDEWALK | SMALL KICKBOARD (LOWER/SMALL) |
| BICYCLE ROAD | LARGE KICKBOARD, ELECTRIC BIKE (MIDDLE/MEDIUM) |
| ROADWAY | SCOOTER (UPPER/LARGE) |

FIG.5

| CONGESTION DEGREE | RECOMMENDED PERSONAL MOBILITY (SIZE) |
|---|---|
| HIGH | SMALL KICKBOARD (SMALL) |
| MIDDLE | LARGE KICKBOARD, ELECTRIC BIKE (MEDIUM) |
| LOW | SCOOTER (LARGE) |

FIG.6

| CLASSIFICATION | TERRAIN STATE | RECOMMENDED PERSONAL MOBILITY |
|---|---|---|
| PAVED STATE | PAVED | ALL TYPES |
| | UNPAVED | SCOOTER (OUTPUT HIGH/SAFETY HIGH) |
| ROAD SURFACE STATE | USUALLY | ALL TYPES |
| | SLIPPERY | ELECTRIC BIKE, SCOOTER (SAFETY HIGH) |
| | VERY SLIPPERY | WALKING |
| SLOPE | USUALLY | ALL TYPES |
| | SEVERITY | LARGE KICKBOARD, SCOOTER (OUTPUT HIGH) |

FIG.7

| CLASSIFICATION | USER INFORMATION | RECOMMENDED PERSONAL MOBILITY |
|---|---|---|
| LICENSE | LICENSED | ALL TYPES |
| | LICENSED | BIKE |
| SHARED PM USAGE HISTORY (NUMBER OF USE) | 20 OR MORE TIMES | ALL TYPES |
| | LESS THAN 20 TIMES | SMALL KICKBOARD |
| | 0 TIME | BIKE |
| SHARED PM USAGE HISTORY (ABNORMAL USAGE) | 0 CASE | ALL TYPES |
| | LESS THAN 10 | SMALL KICKBOARD |
| | 10 OR MORE | BIKE |

FIG.8

| WEATHER INFORMATION | RECOMMENDED PERSONAL MOBILITY |
|---|---|
| SUNNY | ALL TYPES |
| RAINFALL (SNOWFALL) SMALL | ELECTRIC BIKE, SCOOTER |
| RAINFALL (SNOWFALL) LARGE | WALKING |

SERVER AND METHOD OF CONTROLLING THE SAME

CROSS-REFERENCE TO RELATED APPLICATION(S)

This application is based on and claims priority under 35 U.S.C. § 119 to Korean Patent Application No. 10-2020-0039825, filed on Apr. 1, 2020, the disclosure of which is incorporated by reference in its entirety.

TECHNICAL FIELD

The disclosure relates to a server capable of providing a user with a recommended route to a destination, and a method of controlling the same.

BACKGROUND

Recently, with an increase in the market for a personal mobility, which is an electricity-driven single person transportation device, the number of people using the personal mobility is gradually increasing. Accordingly, there are an increasing number of cases in which a service providing a recommended route provides the recommended route using the personal mobility other than a vehicle or public transportation.

However, the current recommended route service only provides a recommended route toward a destination with the shortest time or minimum cost, and does not consider a type of the personal mobility, which may cause inconvenience for the user to actually use the personal mobility.

SUMMARY

An aspect of the disclosure provides a server capable of recommending suitable personal mobility based on a recommended route, and a method of controlling the server. Additional aspects of the disclosure will be set forth in part in the description which follows and, in part, will be obvious from the description, or may be learned by practice of the disclosure.

In accordance with an aspect of the disclosure, a server may include a communicator; and a controller configured to determine a first route to an intermediate destination for a vehicle or a public transport based on departure information and destination information received from an external device, and a second route from the intermediate destination by a foot or a personal mobility to a final destination, to determine a recommended personal mobility based on environment information of the second route, and to operate the communicator to transmit information about each of the first route, the second route, and the recommended personal mobility to the external device.

The environment information may include at least one of a road type, a congestion degree or a terrain state of the second route. The controller may be configured to determine a shared personal mobility having at least one of a maximum speed or size corresponding to the road type of the second route as the recommended personal mobility based on the environment information. The controller may be configured to determine the recommended personal mobility such that the size of the recommended personal mobility is inversely proportional to the congestion degree of the second route based on the environment information.

Additionally, the controller may be configured to determine a shared personal mobility having at least one of output or safety corresponding to the terrain state of the second route as the recommended personal mobility based on the environment information. The controller may be configured to determine the recommended personal mobility based on at least one of weather information or user information and the environment information of the second route. The user information may include at least one of a user's license of the external device or a history of using a shared personal mobility.

The controller may be configured to determine a shared personal mobility having safety corresponding to the weather information as the recommended personal mobility. Further, the controller may be configured to determine last mile areas based on the destination information, determine a plurality of intermediate destinations among the last mile areas, and determine the first route and the second route corresponding to each of the plurality of intermediate destinations. In response to receiving a request for use of the recommended personal mobility from the external device, the controller may be configured to perform a reservation for the recommended personal mobility.

In accordance with another aspect of the disclosure, in a method of controlling a server including a communicator. The method may include determining a first route to an intermediate destination for a vehicle or a public transport based on departure information and destination information received from an external device, and a second route from the intermediate destination by a foot or a personal mobility to a final destination; determining a recommended personal mobility based on environment information of the second route; and operating the communicator to transmit information about each of the first route, the second route, and the recommended personal mobility to the external device.

The environment information may include at least one of a road type, a congestion degree or a terrain state of the second route. The determining of the recommended personal mobility may include determining a shared personal mobility having at least one of a maximum speed or size corresponding to the road type of the second route as the recommended personal mobility based on the environment information. The determining of the recommended personal mobility may include determining the recommended personal mobility such that the size of the recommended personal mobility is inversely proportional to the congestion degree of the second route based on the environment information.

The determining of the recommended personal mobility may include determining a shared personal mobility having at least one of output or safety corresponding to the terrain state of the second route as the recommended personal mobility based on the environment information. The determining of the recommended personal mobility may include determining the recommended personal mobility based on at least one of weather information or user information and the environment information of the second route. The user information may include at least one of a user's license of the external device or a history of using a shared personal mobility.

The determining of the recommended personal mobility may include determining a shared personal mobility having safety corresponding to the weather information as the recommended personal mobility. The determining of the first route and the second route may include determining last mile areas based on the destination information; determining a plurality of intermediate destinations among the last mile areas; and determining the first route and the second route corresponding to each of the plurality of intermediate destinations. The method may further include when receiving a request for use of the recommended personal mobility from the external device, performing a reservation for the recommended personal mobility.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 4 is a view for describing a case in which a server determines recommended personal mobility based on a road type of a second route according to an exemplary embodiment.

FIG. 5 is a view for describing a case in which a server determines recommended personal mobility based on a congestion degree of a second path according to an exemplary embodiment.

FIG. 6 is a view for describing a case in which a server determines recommended personal mobility based on a terrain state of a second route according to an exemplary embodiment.

FIG. 7 is a view for describing a case in which a server determines recommended personal mobility based on user information according to an exemplary embodiment.

FIG. 8 is a view for describing a case in which a server determines recommended personal mobility based on weather information according to an exemplary embodiment.

DETAILED DESCRIPTION

Figure 1:
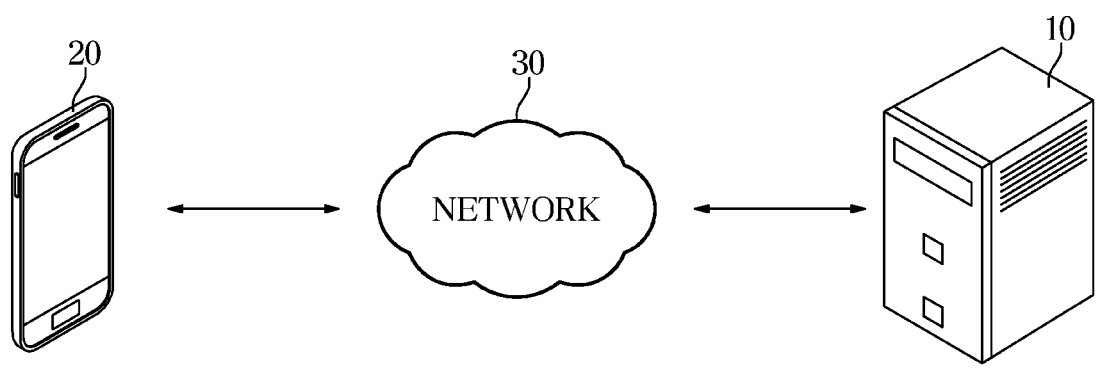
FIG. 1 is a block diagram illustrating a configuration of a route recommendation system including an external device and a server according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numbers refer to like elements throughout this specification. This specification does not describe all components of the exemplary embodiments, and general information in the technical field to which the disclosure belongs or overlapping information between the embodiments is not described. It should be understood that when a component is referred to as being "connected" to another component, it can be directly or indirectly connected to the other component. When a component is indirectly connected to another component, it may be connected to the other component through a wireless communication network. Still further, it is to be understood that the singular forms "a," "an," and "the" include plural referents unless the context clearly dictates otherwise.

As used herein, the terms "portion," "unit," "block," "member," or "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process that is processed by a processor.

Reference numerals used in operations are provided for convenience of description, without describing the order of the operations. The operations can be executed in a different order from the stated order unless a specific order is definitely specified in the context. Hereinafter, embodiments of a server and a method of controlling the server according to aspects of the disclosure are described in detail with reference to the accompanying drawings.

FIG. 1 is a block diagram illustrating a configuration of a route recommendation system including an external device and a server according to an exemplary embodiment. Referring to FIG. 1, a route recommendation system 1 may include a server 10 configured to provide a recommended route, an external device 20 configured to request the recommended route, and a network 30 for communication.

The server 10 may be configured to receive departure information and destination information from the external device 20 and determine a recommended route based on the departure information and the destination information. Particularly, the server 10 may be configured to determine the recommended route consisting of a first route to an intermediate destination capable of being traveled by a vehicle or a public transportation, and a second route from the intermediate destination capable of being traveled by foot or a personal mobility to a final destination.

At this time, the server 10 may be configured to determine the recommended personal mobility most suitable for movement in the second route based on environment information of the second route. The environment information may include at least one of a road type of the second route, a congestion degree in the second route, and a terrain state of the second route. The server 10 may be configured to transmit information about recommended routes including the first route and the second route and information about recommended personal mobility to the external device. In response to receiving a request for use of the recommended personal mobility from the external device, the server 10 may be configured to perform reservation for recommended personal mobility.

The external device 20 may be configured to receive the departure information and the destination information from the user, and transmit the received departure information and destination information to the server 10. In addition, the external device 20 may be configured to receive information about recommended routes and recommended personal mobility from the server 10, and receive the request for use of the recommended personal mobility from the user. When the external device 20 receives the request for use of the recommended mobility from the user, the external device 20 may be configured to transmit the request for use of the recommended mobility to the server 10.

Accordingly, the external device 20 may be configured to receive information from the user, and may correspond to an electronic device (e.g., a smart phone, a desktop, etc.) capable of transmitting and receiving information to and from the server 10. In addition, the network 30 may support wired communication or wireless communication between the server 10 and the external device 20, and may be applied to a network device of a known type. In the above, a configuration of the route recommendation system 1 has been briefly described. Hereinafter, a route recommendation operation and a recommended personal mobility determination operation will be described in more detail.

Figure 2:
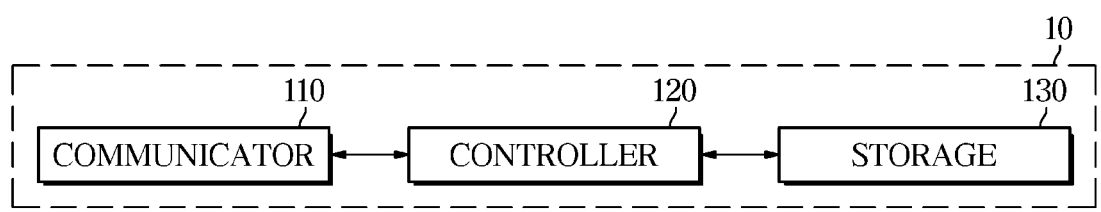
FIG. 2 is a control block diagram of a server according to an exemplary embodiment.

FIG. 2 is a control block diagram of a server according to an exemplary embodiment. Referring to FIG. 2, the server 10 may include a communicator 110 configured to transmit and receive information to and from the external device 20, a controller 120 configured to determine the recommended routes and the recommended personal mobility in the recommended routes, and a storage 130 configured to store various information necessary for control. The communicator 110 may be configured to transmit and receive information to and from the external device 20 via the network 30.

Accordingly, the communicator 110 may be applied with a communication equipment of a known type.

The controller 120 may be configured to determine the recommended route based on the departure information and the destination information received from the external device 20. In other words, the controller 120 may be configured to determine the recommended route that may reach the destination from the departure in response to preset conditions (e.g., shortest time, minimum cost, etc.) by combining the departure information and the destination information with pre-stored map information. The controller 120 may use a known algorithm for route recommendation. At this time, the controller 120 may be configured to determine the recommended route consisting of the first route to the intermediate destination reachable by the vehicle or the public transportation, and the second route from the intermediate destination reachable by foot or the personal mobility to the final destination.

Particularly, the controller 120 may be configured to determine a last mile area based on the destination information and the map information, determine the intermediate destination among the last mile areas, and determine the first route to the intermediate destination and the second route from the intermediate destination to the final destination. The last mile area may correspond to an area in which the public transportation is not provided or movement using the foot or the personal mobility is advantageous rather than the vehicle and the public transportation. For example, the last mile area may correspond to an area between the final destination indicated by the destination information and a subway station or a bus stop proximate to the final destination. Particularly, the intermediate destination may be determined as either the subway station or the bus stop proximate to the final destination.

After determining the intermediate destination, the controller 120 may be configured to determine information about the first route to the intermediate destination, and determine information about the second route from the intermediate destination to the final destination. In particular, the information about the first route may also include information about a moving device (e.g., bus, subway, vehicle, etc.) when traveling to the first route. Additionally, the controller 120 may be configured to determine the recommended personal mobility corresponding to the most suitable personal mobility when moving to the second route based on the environment information of the second route.

The recommended personal mobility may correspond to personal mobility determined to be the most suitable for moving the second route of the recommended route among shared personal mobility that is owned by a service provider and may be rented by the user in real time. At this time, the personal mobility, which is an electricity-driven single person transportation device, and may also include a bicycle that is not electricity-driven, according to the embodiment.

The environment information may include at least one of the road type of the second route, the congestion degree in the second route, or the terrain state of the second route. The determination of recommended personal mobility based on the environment information will be described in detail later. In addition, according to the exemplary embodiment, the controller 120 may be configured to determine the recommended personal mobility in consideration of at least one of weather information or user information in addition to environment information of the second route.

The user information may include at least one of information about whether the user has a license of the external device 20 or information about a history of using the shared personal mobility. The determination of the recommended personal mobility based on the user information or the weather information will be described in detail later. The controller 120 may be configured to operate the communicator 110 to transmit information regarding each of the first route, the second route, and the recommended personal mobility to the external device 20. In other words, the controller 120 may be configured to operate the communicator 110 to transmit information regarding the determined recommended routes (including first route and second route) and the recommended personal mobility based on the departure information and the destination information received by the external device 20 that has transmitted the departure information and the destination information.

Through this, the user of the external device 20 may be provided with information about the recommended routes corresponding to the input departure information and destination information, and information about the personal mobility most suitable for the second route. At this time, the controller 120 may be configured to determine a plurality of intermediate destinations in the last mile area, determine the first and second routes corresponding to each of the plurality of intermediate destinations, and individually determine and provide the recommended personal mobility in each second route of the plurality of intermediate destinations. In response to receiving the request for use of the recommended personal mobility from the external device 20, the controller 120 may be configured to perform the reservation for the recommended personal mobility.

The external device 20 may be configured to receive a selection for the second route of any one of a plurality of second routes. When receiving the request for use for the recommended personal mobility determined in the selected second route, the external device 20 may be configured to transmit the request for use for the recommended personal mobility to the server 10. In other words, the controller 120 of the server 10 may be configured to perform the reservation for the recommended personal mobility by requesting the service provider server to use the recommended personal mobility.

The controller 120 may include at least one memory in which a program for performing the above-described operations and operations described below is stored, and at least one processor for executing the stored program. In the case of a plurality of memory and processors, it may be possible that they are integrated in one chip, and it may also be possible to be provided in a physically separate position. The storage 130 may be configured to store various information necessary for control of the server 10, such as information about correlation between the environment information and the recommended personal mobility, map information, and the like. Accordingly, the storage 130 may use a storage medium of a known type.

Figure 3:
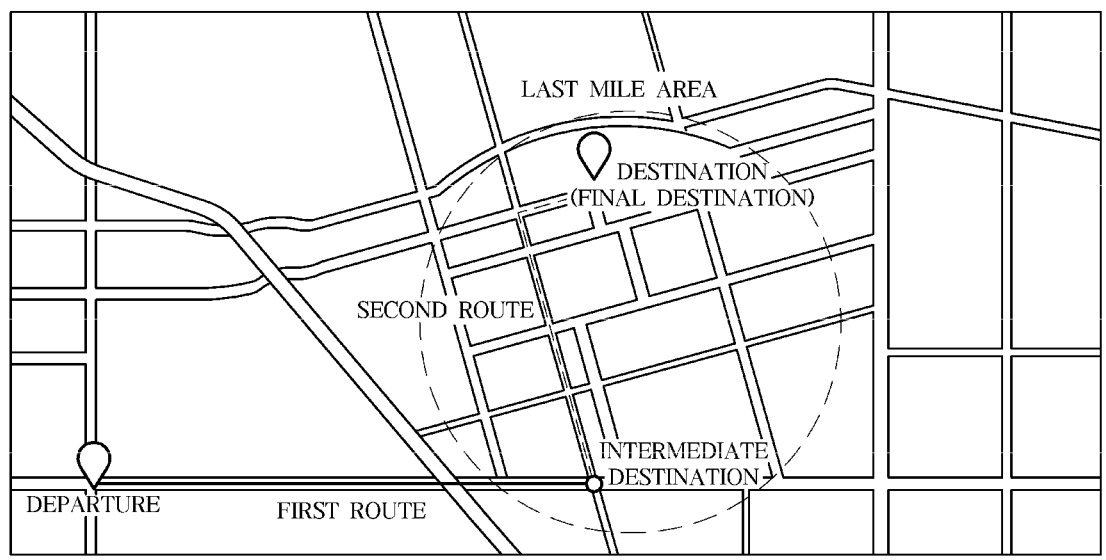
FIG. 3 is a view for describing a case in which a server determines a recommended route based on destination information according to an exemplary embodiment.

FIG. 3 is a view for describing a case in which a server determines a recommended route based on destination information according to an exemplary embodiment. Referring to FIG. 3, the controller 120 may be configured to determine the recommended route based on the departure information and the destination information received from the external device 20. In other words, the controller 120 may be configured to determine the recommended route that reaches the destination from the departure in response to preset conditions (e.g., shortest time, minimum cost, etc.) by combining the departure information and the destination information with pre-stored map information. The controller 120 may use the known algorithm for route recommendation.

At this time, the controller 120 may be configured to determine the recommended route consisting of the first route to the intermediate destination reachable by the vehicle or the public transportation, and the second route from the intermediate destination reachable by the foot or the personal mobility to the final destination. Particularly, the controller 120 may be configured to determine the last mile area based on the destination information and the map information, determine the intermediate destination among the last mile areas, and determine the first route to the intermediate destination and the second route from the intermediate destination to the final destination.

In particular, the last mile area may correspond to the area in which the public transportation is not provided or movement by the foot or the personal mobility is advantageous rather than the vehicle and the public transportation. For example, the last mile area may correspond to the area between the final destination indicated by the destination information and the subway station or the bus stop proximate to the final destination. The intermediate destination may be determined as either the subway station or the bus stop proximate to the final destination.

After determining the intermediate destination, the controller 120 may be configured to determine information about the first route to the intermediate destination, and determine information about the second route from the intermediate destination to the final destination. In particular, the information about the first route may also include information about the moving device (e.g., bus, subway, vehicle, etc.) when moving to the first route.

FIG. 4 is a view for describing a case in which a server determines recommended personal mobility based on a road type of a second route according to an exemplary embodiment, FIG. 5 is a view for describing a case in which a server determines recommended personal mobility based on a congestion degree of a second path according to an exemplary embodiment, and FIG. 6 is a view for describing a case in which a server determines recommended personal mobility based on a terrain state of a second route according to an exemplary embodiment.

Referring to FIGS. 4 to 6, the controller 120 may be configured to determine the recommended personal mobility corresponding to the most suitable personal mobility when moving to the second route based on the environment information of the second route. The recommended personal mobility may correspond to personal mobility determined to be the most suitable for moving the second route of the recommended route among the shared personal mobility that is owned by a service provider and may be rented by the user in real time.

At this time, the personal mobility, which is the electricity-driven single person transportation device, and may also include the bicycle that is not electricity-driven, according to the exemplary embodiment. The environment information may include at least one of the road type of the second route, the congestion degree in the second route, or the terrain state of the second route. The server 10 may be configured to receive the environment information in real time or periodically from an external server. Hereinafter, the determination of the recommended personal mobility in the second route based on the environment information will be described in detail.

As illustrated in FIG. 4, the controller 120 may be configured to determine the shared personal mobility having at least one of a maximum speed or size corresponding to the road type of the second route as the recommended personal mobility based on the environment information. For example, when the road type of the second route is a sidewalk, the controller 120 may be configured to determine the shared personal mobility (e.g., a small kickboard (maximum speed/size: lower/small) having the lower maximum speed and a smaller size as the recommended personal mobility than when the road type of the second route is a bicycle road. For example, when the road type of the second route is a sidewalk, the controller 120 may be configured to determine the shared personal mobility (e.g., small kickboards (maximum speed/size: lower/small)) having a lower maximum speed and a smaller size than when the road type of the second route is a bicycle road as the recommended personal mobility.

In addition, when the road type of the second route is the bicycle road, the controller 120 may be configured to determine the shared personal mobility (e.g., large kickboards, electric bikes (maximum speed/size: middle/medium)) having a higher maximum speed and a larger size as the recommended personal mobility than when the road type of the second route is the sidewalk, and having the lower maximum speed and the smaller size than when the road type of the second route is a roadway as the recommended personal mobility. In addition, when the road type of the second route is the roadway, the controller 120 may be configured to determine the shared personal mobility (e.g., scooter (maximum speed/size: upper/large)) having the higher maximum speed and the larger size than when the road type of the second route is the bicycle road as the recommended personal mobility.

Referring to FIG. 5, the controller 120 may be configured to determine the recommended personal mobility such that the size of recommended personal mobility is inversely proportional to the congestion degree of the second route based on the environment information. In other words, the controller 120 may be configured to determine the shared personal mobility of a smaller size as the recommended personal mobility as the congestion degree in the second route is higher.

For example, when the congestion degree in the second route is high, the controller 120 may be configured to determine the small kickboard having the small size as the recommended personal mobility. When the congestion degree in the second route is low, the controller 120 may be configured to determine the scooter having the large size as the recommended personal mobility. When the congestion degree in the second route is in the middle, the controller 120 may be configured to determine the electric bike having the medium size as the recommended personal mobility.

Referring to FIG. 6, the controller 120 may be configured to determine the shared personal mobility having at least one of output or safety corresponding to the terrain state of the second route as the recommended personal mobility based on the environment information. At this time, the terrain state may include at least one of whether the second route is paved, a road surface state of the second route, or a slope of the second route.

Particularly, when a pavement state of the second route is in an unpaved state as recommended personal mobility, the controller 120 may be configured to determine the shared personal mobility (e.g., scooter (output high/safety high)) having high output and high safety as the recommended personal mobility. In addition, when the road surface state of the second route is slippery, the controller 120 may be configured to determine the shared personal mobility with high safety as the recommended personal mobility. For example, the controller 120 may be configured to determine the electric bicycle, the scooter, or the like, which rides in a sitting position as recommended personal mobility, rather than the kickboard that rides in a standing position. At this time, the controller 120 may be configured to recommend walking in addition to the recommended personal mobility when the road surface state of the second route is very slippery according to the exemplary embodiment.

In addition, as a degree of slope of the second route increases, the controller 120 may be configured to determine the shared personal mobility with high output as the recommended personal mobility. For example, the controller 120 may be configured to determine the large kickboard, the scooter, and the like with high output as the recommended personal mobility when the slope is severe. In addition, the controller 120 may be configured to determine a range for a wheel size of the recommended personal mobility based on the environment information in the second route, according to the exemplary embodiment, and determine the shared personal mobility corresponding to the determined wheel size as the recommended personal mobility.

Particularly, the controller 120 may be configured to determine a minimum wheel size based on the road type or the terrain state of the second route, and determine a maximum wheel size based on the road type and the congestion degree of the second route. For example, when the terrain state of the second route is the unpaved state, the controller 120 may be configured to determine the wheel size at which a ratio between a maximum height change on the road surface of the second route and a wheel diameter is less than a preset ration (for example, 5%) to be suitable for shock absorption and a steering operation as the minimum wheel size.

In this way, the server 10 may be configured to determine the personal mobility with high mobility in the second route based on the environment information in the second route. At this time, the server 10 may be configured to determine the recommended personal mobility based on at least one of various factors (e.g., road type, congestion degree, terrain state) included in the environment information. Through this, when moving the second route, the server 10 may be configured to recommend the shared personal mobility having the best mobility efficiency, and the user may efficiently reach the final destination using the recommended personal mobility.

FIG. 7 is a view for describing a case in which a server determines recommended personal mobility based on user information according to an exemplary embodiment, and FIG. 8 is a view for describing a case in which a server determines recommended personal mobility based on weather information according to an exemplary embodiment. Referring to FIGS. 7 and 8, the controller 120 may be configured to determine the recommended personal mobility based on at least one of the weather information or the user information and the environment information of the second route.

In other words, the controller 120 may be configured to determine recommended personal mobility based on at least one of weather information or user information in addition to the environment information of the second route. The user information may include at least one of the user's license of the external device 20 or the history of using the shared personal mobility. The server 10 may be configured to receive the user information from the external device 20, and obtain the user information by requesting the user information from the service provider server based on user identification information received from the external device 20.

In response to the controller 120 determining that the user has the license based on the user information, the controller

120 may be configured to determine all types of the shared personal mobility as the recommended personal mobility. When the controller 120 determines that the user does not have the license based on the user information, the controller 120 may be configured to determine only the bicycle as the recommended personal mobility.

In addition, the controller 120 may be configured to limit the type of recommended personal mobility as the number of uses of the shared personal mobility is lower based on the user information. For example, the controller 120 may be configured to determine all types of the shared personal mobility as the recommended personal mobility when the user information indicates use of 20 or more times. When the user information indicates use of less than 20 times, the controller 120 may be configured to determine only the small kickboard that is relatively easier to operate as the recommended personal mobility. When the user information indicates use of 0, the controller 120 may be configured to determine only the bicycle as the recommended personal mobility.

In addition, the controller 120 may be configured to limit the type of recommended personal mobility as the number of abnormal use of the shared personal mobility increases based on the user information. For example, the controller 120 may be configured to determine all types of the shared personal mobility as the recommended personal mobility when the user information indicates abnormal use of 0. When the user information indicates abnormal use of less than 10 times, the controller 120 may be configured to determine only the small kickboard that is relatively easier to operate as the recommended personal mobility. When the user information indicates abnormal use of 10 or more times, the controller 120 may be configured to determine only the bicycle as the recommended personal mobility.

As illustrated in FIG. 8, the controller 120 may be configured to determine the shared personal mobility having safety corresponding to the weather information as the recommended personal mobility. At this time, the server 10 may be configured to receive the weather information from the external server. Particularly, the controller 120 may be configured to determine the shared personal mobility with higher safety as the recommended personal mobility as rainfall or snowfall increases based on the weather information. For example, the controller 120 may be configured to determine the electric bicycle, the scooter, or the like, which rides in the sitting position, as the recommended personal mobility, rather than the kickboard that rides in the standing position when there is rainfall or snowfall compared to when it is sunny. According to the exemplary embodiment, the controller 120 may be configured to recommend walking in addition to the recommended personal mobility when rainfall or snowfall is greater than or equal to a preset value.

Figure 9:
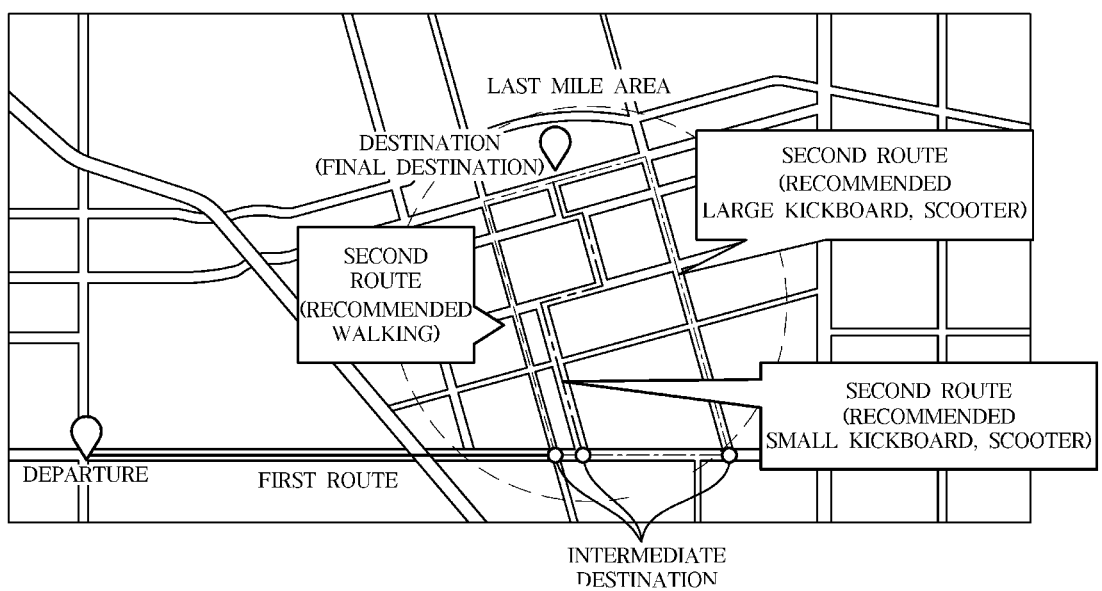
FIG. 9 is a view for describing a case in which a server determines a plurality of recommended routes based on destination information according to an exemplary embodiment.

FIG. 9 is a view for describing a case in which a server determines a plurality of recommended routes based on destination information according to an embodiment. Referring to FIG. 9, the controller 120 may be configured to determine the plurality of intermediate destinations in the last mile area, determine the first and second routes corresponding to the each of the plurality of intermediate destinations, and individually determine and provide the recommended personal mobility in each second route of the plurality of intermediate destinations.

For example, the controller 120 may be configured to determine each of a plurality of public transportation stops (e.g., underground stations, bus stops, etc.) located within a predetermined distance from the final destination as the intermediate destination, determine the first route and the second route corresponding to each of the plurality of intermediate destinations, and determine the recommending personal mobility corresponding to each second route based on the environment information of each second route. Through this, the server 10 may be configured to provide various routes to the final destination to the user, and provide the recommended personal mobility corresponding to each route.

Hereinafter, a method of controlling the server 10 according to the exemplary embodiment will be described. The server 10 according to the above-described exemplary embodiment may be applied to the method of controlling the server 10 described later. Therefore, the contents described with reference to FIGS. 1 to 9 are equally applicable to the method of operating the server 10 according to the exemplary embodiment even if there is no special mention.

Figure 10:
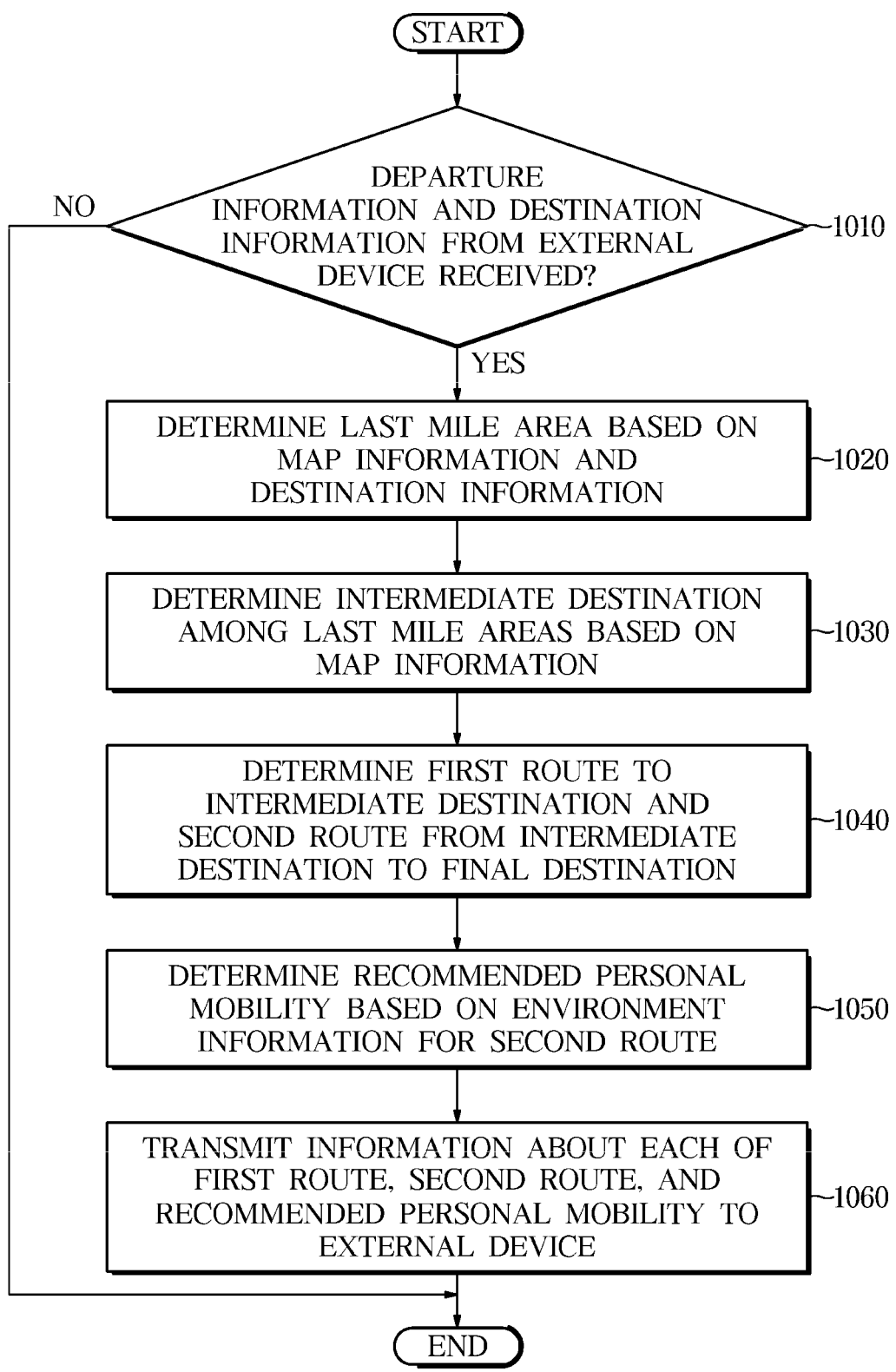
FIG. 10 is a flowchart illustrating a case of determining recommended personal mobility among control methods of a server according to an exemplary embodiment.

FIG. 10 is a flowchart illustrating a case of determining recommended personal mobility among control methods of a server according to an exemplary embodiment. Referring to FIG. 10, in response to receiving the departure information and the destination information from the external device 20 (YES in 1010), the server 10 may be configured to determine the last mile area based on the map information and the destination information (1020). The server 10 may be configured to determine the intermediate destination among the last mile areas based on the map information (1030). The server 10 may be configured to determine the first route to the intermediate destination and the second route from the intermediate destination to the final destination (1040).

Additionally, the controller 120 may be configured to determine the recommended route based on the departure information and the destination information received from the external device 20. In other words, the controller 120 may be configured to determine the recommended route toward the destination from the departure in response to preset conditions (e.g., shortest time, minimum cost, etc.) by combining the departure information and the destination information with pre-stored map information. The controller 120 may use the known algorithm for route recommendation. At this time, the controller 120 may be configured to determine the recommended route consisting of the first route to the intermediate destination reachable by the vehicle or the public transportation, and the second route from the intermediate destination reachable by foot or the personal mobility to the final destination.

Particularly, the controller 120 may be configured to determine the last mile area based on the destination information and the map information, determine the intermediate destination among the last mile areas, and determine the first route to the intermediate destination and the second route from the intermediate destination to the final destination. In particular, the last mile area may correspond to the area in which the public transportation is not provided or movement using the foot or the personal mobility is advantageous rather than the vehicle and the public transportation.

For example, the last mile area may correspond to the area between the final destination indicated by the destination information and the subway station or the bus stop proximate to the final destination. In particular, the intermediate destination may be determined as either the subway station or the bus stop proximate to the final destination. After determining the intermediate destination, the controller 120 may be configured to determine information about the first route to the intermediate destination, and determine information about the second route from the intermediate destination to the final destination. The information about the first route may also include information about the moving device (e.g., bus, subway, vehicle, etc.) when moving to the first route.

The server 10 may be configured to determine the recommended personal mobility based on the environment information for the second route (1050), and transmit the information about each of the first route, second route, and the recommended personal mobility to the external device 20 (1060). Particularly, the controller 120 may be configured to determine the recommended personal mobility corresponding to the most suitable personal mobility when moving to the second route based on the environment information of the second route.

The recommended personal mobility may correspond to personal mobility determined to be the most suitable for moving the second route of the recommended route among shared personal mobility that is owned by the service provider and may be rented by the user in real time. At this time, the personal mobility, which is the electricity-driven single person transportation device, and may also include the bicycle that is not electricity-driven, according to the exemplary embodiment. The environment information may include at least one of the road type of the second route, the congestion degree in the second route, or the terrain state of the second route.

In addition, according to the exemplary embodiment, the controller 120 may be configured to determine the recommended personal mobility based on at least one of the weather information or the user information in addition to the environment information of the second route. The user information may include at least one of information about whether the user has the license of the external device 20 or information about the history of using the shared personal mobility.

Thereafter, the controller 120 may be configured to operate the communicator 110 to transmit information regarding each of the first route, the second route, and the recommended personal mobility to the external device 20. In other words, the controller 120 may be configured to operate the communicator 110 to transmit information about the determined recommended routes (including first route and second route) and the recommended personal mobility based on the departure information and the destination information received by the external device 20 that has transmitted the departure information and the destination information. Through this, the user of the external device 20 may be provided with information about the recommended routes corresponding to the input departure information and destination information, and information about the personal mobility most suitable for the second route.

Figure 11:
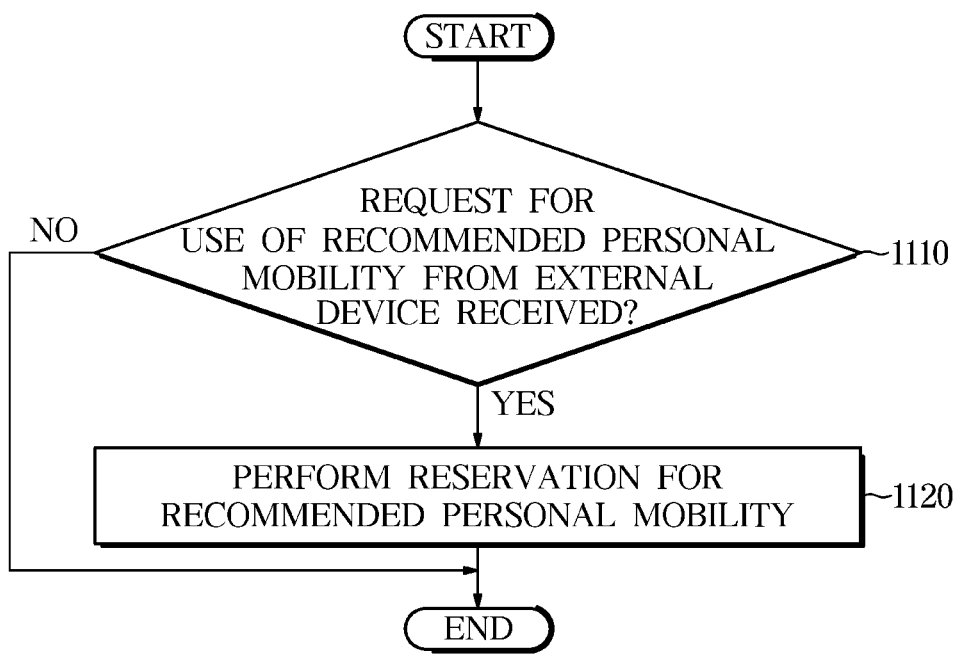
FIG. 11 is a flowchart illustrating a case of reserving recommended personal mobility among control methods of a server according to an exemplary embodiment.

FIG. 11 is a flowchart illustrating a case of reserving recommended personal mobility among control methods of a server according to an exemplary embodiment. The method described herein may be executed by a controller. Referring to FIG. 11, when the server 10 receives the request for use of recommended personal mobility from the external device 20 (YES in 1110), the server 10 may be configured to perform the reservation for the recommended personal mobility (1120).

The external device 20 may be configured to receive the selection for the second route of any one of the plurality of second routes. When receiving the request for use for the recommended personal mobility determined in the selected second route, the external device 20 may be configured to transmit the request for use for the recommended personal mobility to the server 10. In particular, the controller 120 of the server 10 may be configured to perform the reservation for the recommended personal mobility by requesting the service provider server to use the recommended personal mobility. Through this, the user of the external device 20 may move to the final destination more efficiently using the recommended personal mobility.

According to the server and the method of controlling the server according to the exemplary embodiments, by recommending suitable personal mobility based on the status of the recommended route, the user may more conveniently reach the destination, and the provider providing the shared personal mobility also operates the shared personal mobility more efficiently.

The disclosed exemplary embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all types of recording media storing commands that can be interpreted by a computer. For example, the non-transitory computer-readable recording medium may be, for example, ROM, RAM, a magnetic tape, a magnetic disc, flash memory, an optical data storage device, and the like.

Exemplary embodiments of the disclosure have thus far been described with reference to the accompanying drawings. It should be apparent to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:
1. A server, comprising:
a communicator configured to transmit and receive information to and from an external device; and
a controller configured to control the communicator,
wherein the controller is configured to:
receive departure information and destination information from the external device,
determine last mile areas based on a map information and the destination information,
determine an intermediate destination in the last mile area,
determine a first route reachable from departure to the intermediate destination by a vehicle or a public transport, and a second route reachable from the intermediate destination to a final destination by a personal mobility device,
determine a recommended personal mobility device from among a plurality of shared personal mobility devices based on environment information of the second route, the environment information being a road type or a terrain state of the second route, wherein the recommended personal mobility device is selected based on at least one of a maximum speed or a size corresponding to the road type, or an output or safety level corresponding to the terrain state, wherein the environment information is collected in real time, transmit information about each of the first route, the second route, and the recommended personal mobility device to the external device, and upon receiving a request from the external device, perform a reservation of the recommended personal mobility device by requesting a service provider server to use the recommended personal mobility device for a user of the external device, the reservation being made when the controller sends a control signal to the service provider server via a network and receives a response from the service provider server via the network so as to perform the reservation, wherein the reservation is dynamically adjusted based on the environment information collected in real time and changes in availability of the shared personal mobility devices.

2. The server according to claim 1, wherein the environment information includes at least one of the road type, a congestion degree or the terrain state of the second route.

3. The server according to claim 2, wherein the controller is configured to determine the recommended personal mobility device such that the size of the recommended personal mobility device is inversely proportional to the congestion degree of the second route based on the environment information.

4. The server according to claim 1, wherein the controller is configured to determine the recommended personal mobility device based on at least one of weather information or user information and the environment information of the second route.

5. The server according to claim 4, wherein the user information includes at least one of a user's license of the external device or a history of using one of the shared personal mobility devices.

6. The server according to claim 4, wherein the controller is configured to determine the recommended mobility device corresponding to the weather information.

7. The server according to claim 1, wherein the controller is configured to determine last mile areas based on the destination information, determine a plurality of intermediate destinations among the last mile areas, and determine the first route and the second route corresponding to each of the plurality of intermediate destinations.

8. A method of controlling a server including a communicator, comprising:
receiving, by a controller, departure information and destination information from an external device;
determining, by the controller, last mile areas based on a map information and the destination information;
determining, by the controller, an intermediate destination in the last mile area,
determining, by the controller, a first route reachable from departure to the intermediate destination by a vehicle or a public transport, and a second route reachable from the intermediate destination to a final destination by a personal mobility device;
determining, by the controller, a recommended personal mobility device from among a plurality of shared personal mobility devices based on environment information of the second route, the environment information being a road type or a terrain state of the second route, wherein the recommended personal mobility device is selected based on at least one of a maximum speed or a size corresponding to the road type, or an output or safety level corresponding to the terrain state, wherein the environment information is collected in real time;
transmitting information about each of the first route, the second route, and the recommended personal mobility device to the external device; and
upon receiving a request from the external device, performing a reservation of the recommended personal mobility device by requesting a service provider server to use the recommended personal mobility device for a user of the external device, the reservation being made when the controller sends a control signal to the service provider server via a network and receives a response from the service provider server via the network so as to perform the reservation, wherein the reservation is dynamically adjusted based on the environment information collected in real time and changes in availability of the shared personal mobility devices.

9. The method according to claim 8, wherein the environment information includes at least one of the road type, a congestion degree or the terrain state of the second route.

10. The method according to claim 9, wherein the determining of the recommended personal mobility device includes:
determining, by the controller, the recommended personal mobility device such that the size of the recommended personal mobility device is inversely proportional to the congestion degree of the second route based on the environment information.

11. The method according to claim 8, wherein the determining of the recommended personal mobility device includes:
determining, by the controller, the recommended personal mobility device based on at least one of weather information or user information and the environment information of the second route.

12. The method according to claim 11, wherein the user information includes at least one of a user's license of the external device or a history of using one of the shared personal mobility devices.

13. The method according to claim 11, wherein the determining of the recommended personal mobility device includes:
determining, by the controller, one of the shared personal mobility devices corresponding to the weather information;
determining, by the controller, the one of the shared personal mobility devices as the recommended personal mobility device.

14. The method according to claim 8, wherein the determining of the first route and the second route includes:
determining, by the controller, last mile areas based on the destination information;
determining, by the controller, a plurality of intermediate destinations among the last mile areas; and
determining, by the controller, the first route and the second route corresponding to each of the plurality of intermediate destinations.

* * * * *